United States Patent Office 2,716,162
Patented Aug. 23, 1955

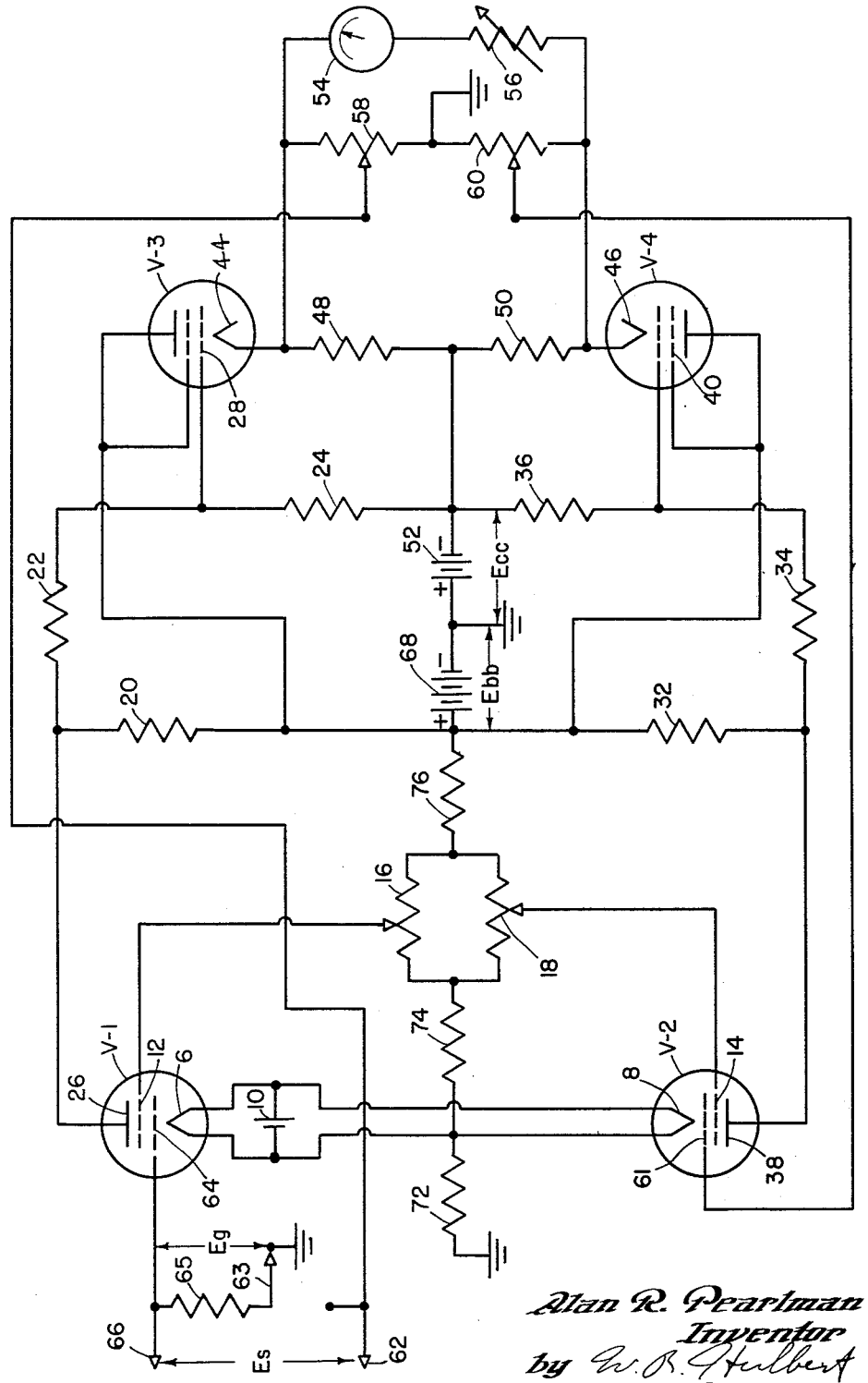

2,716,162

BALANCED AMPLIFIER

Alan R. Pearlman, Glendale, Calif., assignor to Tracerlab, Inc., Boston, Mass., a corporation of Massachusetts Application January 22, 1952, Serial No. 267,614

3 Claims. (Cl. 179—171)

This invention relates to direct current amplifiers of the electronic tube type, particularly to amplifiers used in electrometer circuits where minute currents as small as one-millionth of a microampere or less, such as encountered in ionization chambers, are to be measured.

To measure such a minute current it is customary to cause the same to flow through a resistance placed in the control grid circuit of an electronic tube. The voltage drop across the resistor is impressed upon the grid of the tube, causing a change in the plate current thereof. The change in plate current may either be read directly on a meter or further amplified. Electron tubes with the desired extremely low control-grid current characteristics exhibit low trans-conductance which makes it difficult to drive an indicating meter directly. Multi-tube circuits are thus preferable to single tube circuits, for the input tube can be chosen for low grid-current and the output tube for high current amplification.

One undesirable effect found in direct current amplifier circuits is that supply-voltage variations and tube aging cause shifts in the operating point and in calibration (commonly termed "zero-drift"). The present art uses either balanced amplifiers or feedback amplifiers in an effort to remedy this undesirable shifting.

In a balanced amplifier the indicating meter is connected between the plates of two electron tubes of similar characteristics. A signal voltage is applied to the control grid of one of the tubes while the control grid of the other is kept at a fixed voltage. All other corresponding elements of the two tubes are connected through identical networks to common voltage supplies. If the characteristics of the two tubes are closely matched, any supply voltage variation affecting the operating point of one tube will tend to affect the other tube by nearly the same amount, and the net effect on the output indication will be very small. Manufacturing variations, however, from tube to tube of the same type usually exist, and it is improbable that two tubes in a balanced circuit will be so closely matched that absolutely no zero-drift will take place as the supply voltage varies. Furthermore, tube aging usually results in changing mutual conductance which results in changing calibration, i. e., the ratio of output indication to input grid signal.

The feedback amplifier is employed as a means of obtaining stability of the operating point though variations in supply voltage occur. In such a circuit the input tube is chosen for low grid current while the output tube is chosen for sufficient current amplification to drive the indicating meter. With a large ratio of feedback the amplification of the circuit is substantially independent of supply voltage variations and tube characteristics. As the feedback tends to hold the input grid at a fixed potential with reference to ground the effective grid-to-ground capacitance is reduced, resulting in a much faster over-all circuit response than is possible using the same value of grid-resistance in a circuit not employing feedback. This is of particular importance in electrometer circuits where grid resistors of $10^{11}$ ohms and greater are employed.

With the foregoing in mind, the primary object of the present invention is to provide a direct current amplifier that will respond to minute currents, exhibit stability against supply voltage variations, and minimize variations from within the vacuum tube.

Another object of the invention is to provide a direct current electrometer amplifier fully responsive to the output of radiation detectors.

The circuit of the invention is featured by the adaptation of the feedback principle to a balanced amplifier to provide a novel and highly useful solution of the problem of accurate measurement of minute currents. These and other numerous objects, features, and advantages of the invention will appear from the following detailed description, together with the accompanying drawing of a preferred circuit according to the invention.

Referring to the drawing, the sole figure is a circuit diagram showing the invention as embodied in a direct current amplifier.

Vacuum tubes $V_1$ and $V_2$ constitute the input tubes of the balanced circuit and have as nearly identical characteristics as possible. They are chosen for the desired input characteristics, for instance low grid-current and moderately high voltage amplification when used as electrometers. The filaments 6 and 8 thereof (or heaters of indirectly heated cathode types) are operated in parallel from a common source such as the filament battery 10 or other suitable power supply, a bleeder from the plate supply for example. Since identical voltages are presented to their filaments, emission changes due to voltage changes will be very nearly the same in both the tubes $V_1$ and $V_2$, as will changes in bias voltage due to the fact that the filamentary cathodes are not equipotential structures. In the diagram the common cathode bias voltage and the screen grids 12 and 14 of $V_1$ and $V_2$ are supplied from the plate supply bleeder string (as hereinafter described, the two screen grid potentiometers 16 and 18 affording a means of adjusting the D. C. operating levels of either tube independently for purposes of balancing (zeroing) the circuit. Resistors 20, 22, and 24 form a coupling network between the plate 26 of the tube $V_1$ and the grid 28 of the tube $V_3$. The resistors 32, 34, and 36 perform the same function of coupling the plate 38 of tube $V_2$ to the grid 40 of the tube $V_4$. The use of both a positive and negative power supply permits this convenient means of operating tubes $V_3$ and $V_4$ at such a D. C. level that their respective cathodes 44 and 46 can be in the vicinity of zero volts from ground potential. The small sacrifice of gain resulting in the division of the plate voltages of $V_1$ and $V_2$ by the ratio $$\frac{R_{24}}{R_{22}+R_{24}} \text{ and } \frac{R_{36}}{R_{34}+R_{36}}$$

can be avoided, if desired, by coupling $V_1$ to $V_3$ and $V_2$ to $V_4$ by constant voltage elements (such as batteries or glow-tubes) rather than resistors. The cathodes 44 and 46 of the output tubes, are returned through resistors 48 and 50 to a voltage supply (battery 52) which is negative with respect to ground at a potential $E_{cc}$, thereby permitting these cathodes to assume voltages either negative or positive with respect to ground in accordance with the control-grid voltage changes derived from the plates 26 and 38 of $V_1$ and $V_2$, respectively. An indicating meter 54 in series with a suitable multiplying variable resistance 56 is connected as shown to read the difference in potential between the cathodes 44 and 46, which is the output indication. Identical precision dividing networks consisting of accurately tracking ganged potentiometers 58 and 60, or tapped "strings" of precision resistors, are connected between the cathodes 44 and 46 and ground. The variable arm of the resistor 60 can be connected directly to the grid 61 of the tube $V_2$. The variable arm of the resistor 28 is connected to the input terminal 62.

In order better to illustrate the characteristics of the novel circuit of the invention, I have inserted a single pole double throw switch 63 in the input to the tube $V_1$ so that the grid resistor 65 may be connected to ground for test purposes as shown in the drawing. It will be understood, of course, that for normal operation of the instrument the switch 63 is moved to its other position connecting the resistor 65 between the terminals 62 and 66.

If a voltage $e_g$ is applied between the grid 64 of $V_1$ and ground, the switch 63 being appropriately moved, such voltage will be amplified and a voltage change—$A_{01} e_g$ (where $A_{01}$ is the gain of $V_1$) will appear at the plate of $V_1$. The voltage change at the grid of $V_3$ will be $$\frac{A_{01}R_{24}}{R_{22}+R_{24}}e_g$$

and the voltage change at the cathode 44 of $V_3$ (neglecting the presence of the voltmeter and the resistance 58) will be $$\frac{m}{m+1} \frac{R_{48}}{R_{48}+(V_p/m+1)} \frac{-A_{01}R_{24}}{R_{22}+R_{24}}e_g$$

where $m$ is the amplification factor of $V_3$ and $V_p$ is the plate resistance of the same. Since in most tube types $m$ can be of the order of 10 or more, and since $R_{48}$ can be much greater than $V_p/m+1$, and since reasonable supply voltages can be high enough so that $$\frac{R_{24}}{R_{22}+R_{24}}$$

is in the order of 0.8, the overall amplification $A_1$ can be greater than $0.5\ A_{01}$ and could approach unity if the divider losses $$\frac{R_{24}}{R_{22}+R_{24}}$$

were to be eliminated by use of bias batteries or glow tubes as described before.

If the grid 64 of the tube $V_1$ is returned by the switch 63 to the arm of the potentiometer 58, it can be seen that over-all inverse feedback for D. C. signals has been achieved. If the fraction of the output across resistor 58 appearing at the variable arm is $\beta_1$, the over-all gain of the amplifier configuration will be $$A_{1'} = \frac{A_1}{1+A_1 \cdot \beta_1}$$

where $A_{1'}$ is the ratio of voltage change appearing at the cathode 44 to the input signal applied between terminals 66 and 62.

Similarly, it can be shown that the over-all gain $A_{2'}$ of the amplifier section containing tubes $V_2$ and $V_4$ will be $$A_{2'} = \frac{A_2}{1+A_2 \cdot \beta_2}$$

where $A_2$ is the gain (with feedback) of $V_2$ $V_4$, and $\beta_2$ is the fraction of the output at the cathode 46 determined by the setting of the potentiometer 60.

It can be seen that if $A_1\beta_1$ and $A_2\beta_2$ are large with respect to unity, the values of $A_{1'}$ and $A_{2'}$ approach $$\frac{1}{\beta_1} \text{ and } \frac{1}{\beta_2}$$

respectively and tend to be independent of $A_1$ and $A_2$, and therefore independent of variations in tube characteristics over a wide range. Since the values of $B_1$ and $B_2$ depend on fixed resistances, which are not subject to much variation over a period of time (if not subjected to excess voltages or temperatures), $A_{1'}$ and $A_{2'}$ are quite stable.

Consider an input signal voltage $e_s$ applied to terminals 66 and 62 with the switch 63 in operative position and the amplifier operating under the following conditions.

$\beta_1 = \beta_2 = 1.00$
$A_{01}=$ Gain of $V_1 = 60X$
$A_{02}=$ Gain of $V_2 = 50X$
$A_1=$ Gain of section $V_1-V_3$ without feedback$=30X+$
$A_2=$ Gain of section $V_2-V_4$ without feedback$=25X+$ Assuming a supply voltage variation causing a change in common cathode voltage $e_{k12}$ of $V_1$ and $V_2$, and a change in plate voltage $e_{p1}$ in $V_1$ and $e_{p2}$ in $V_2$. The equivalent grid voltage change which cause $e_{p1}$ can be expressed as $e_{p1}/A_{01}$; similarly the grid voltage change causing a change equivalent to $e_{p2}$ can be regarded as $e_{p2}/A_{02}$.

The total input to amplifier section $$V_1-V_3 = e_s + e_{k12} + \frac{e_{p1}}{A_{01}}$$

The total input to amplifier section $$V_2-V_4 = e_{k12} + \frac{e_{p2}}{A_{02}}$$

It is to be borne in mind that $e_s$ is the signal which one desires to measure and that the output reading should be dependent on $e_s$ and not upon $e_{k12}$ and $e_{p1}$, $e_{p2}$. By assigning practical values to $e_s$, $e_{k12}$, $e_{p1}$, and $e_{p2}$, one can see the advantages in this arrangement in suppressing variations in the output due to undesired voltage changes.

Suppose that $E_{bb}$ is supplied by a battery 68 which decays from 50 to 45 volts during its effective life, and that the total equivalent common cathode voltage $e_{k12}$ changes by the same ratio of 10% from 2 to 1.8 volts. Suppose, furthermore, that the tubes $V_1$ and $V_2$ are not identical in characteristics so that a 3 volt change in $e_{p1}$ is produced due to the change $E_{bb}$ but only 1 volt change in $e_{p2}$ is observed. The total input to section $V_1-V_3$ is $$e_s + e_{k12} + \frac{e_{p1}}{A_{01}} = e_s + 0.2 + \frac{3}{60} = e_s + 0.25$$

The total input to section $V_2-V_4$ is $$e_{k12} + \frac{e_{p2}}{A_{02}} = 0.2 + \frac{1}{50} = 0.22$$

The overall gain of section $V_1-V_3$ is $$\frac{A_1}{1+A_1 \cdot \beta_1} = \frac{30}{1+30} = 0.97$$

The voltage change from the cathode of $V_3$ to ground is $$0.97(e_s + 0.25) = 0.97 e_s + 0.242 v$$

Similarly the gain of section $V_2-V_4$ is $$A_{2'} = \frac{A_2}{1+A_2 \cdot \beta_2} = \frac{25}{1+25} = 0.96$$

And the voltage change from the cathode of $V_3$ to ground is $$0.96(0.22) = .212 v$$

Since the voltmeter output indicator reads the difference between these two voltages, the total output reading is $$0.97 e_s + 0.242 - 0.212 = 0.97 e_s + 0.030$$

The total drift error due to battery voltage change of 10% is then only .030 v. and the change in gain (1–0.91) is only 3%. If section $V_1-V_3$ were used as a "single-ended" amplifier (e. g.—the voltmeter were connected between the cathode of $V_3$) error due to 10% supply voltage change would have been 0.242 volt. The factor of improvement over conventional single-ended feedback circuits is therefore $$\frac{0.242}{0.030} = 8X$$

In actual practice the results seem to show a factor of improvement considerably in excess of the theoretical example just given and a 4-tube feedback arrangement tried in the laboratory seems to be in the order of twenty-five times better than a single-ended 2-tube feedback circuit. Typical circuit values are:

| | |
|---|---|
| Tubes $V_1$, $V_2$ | CK571AX |
| Tubes $V_3$, $V_4$ | CK522AX |
| Battery 68 | +45 v. |
| Battery 52 | −45 v. |
| Resistors 65 | $10^8$ — $10^{12}$ ohms as indicated by value of input current |
| Resistors 20 and 32 | 100 megohms |
| Resistors 22 and 34 | 50 megohms |
| Resistors 24 and 36 | 200 megohms |
| Resistors 48 and 50 | 200,000 ohms |
| Resistors 72 | 10,000 ohms |
| Resistors 74 | 15,000 ohms |
| Resistors 16 and 18 | 20,000 ohm potentiometer |
| Resistors 76 | 220,000 ohms |
| Resistors 56 | 50,000 ohm rheostat |
| Resistors 58 and 60 | 5 megohm gauged precision dividers |
| Meter 54 | 20 microamperes full scale |

The circuit of the invention is applicable wherever a direct current amplifier of high sensitivity and stability is required. For these reasons in addition to operation as an electrometer amplifier for ionization chambers or other radiation detectors it might be well used in pH meters, vacuum tube volt meters, and other similar devices.

While I have herein disclosed and described a preferred embodiment of the invention, it will be understood that the same is susceptible of various modifications and changes within the spirit and scope of the appended claims.

I claim:

1. A direct current amplifier comprising, first and second substantially identical electron tubes each having at least a cathode, an anode, a control grid and a screen grid, means arranged to heat the cathodes of said first and second tubes in parallel, a two terminal input circuit having one terminal connected to the control grid of said first tube, third and fourth substantially identical electron tubes each having at least a cathode, an anode and a control grid, first and second equal resistors serially connected between the cathodes of said third and fourth tubes, a voltage source having a first terminal connected to ground, a second terminal positive with respect to ground, and a third terminal negative with respect to ground, means separately connecting the anodes of said first, second, third and fourth tubes to the second terminal of said voltage source, a first voltage divider connected between the anode of said first tube and the third terminal of said voltage source and a second voltage divider connected between the anode of said second tube and the third terminal of said voltage source, means connecting the control grid of said third tube to a point on said first voltage divider, means connecting the control grid of said fourth tube to a point on said second voltage divider, means connecting the third terminal of said voltage source to the junction of said first and second resistors, first and second serially connected potentiometers connected between the cathodes of said third and fourth tubes, the junction of said potentiometers being grounded, an indicating device connected in parallel with said potentiometers, a first feedback connection between said first potentiometer and the other terminal of said input circuit, and a second feedback connection between said second potentiometer and the control grid of said second tube.

2. The circuit of claim 1 and a third voltage divider connected between the second terminal of said voltage source and ground, and means connecting the cathodes of said first and second tubes to a common point on said third voltage divider.

3. The circuit of claim 2 wherein said third voltage divider includes third and fourth potentiometers connected in parallel, means connecting the movable tap on said third potentiometer to the screen grid of said tube and means connecting the movable tap on said fourth potentiometer to the screen grid of said second tube.

References Cited in the file of this patent

UNITED STATES PATENTS

| | | |
|---|---|---|
| 2,361,198 | Harmon et al. | Oct. 24, 1944 |
| 2,542,160 | Stoner et al. | Feb. 20, 1951 |
| 2,543,819 | Williams | Mar. 6, 1951 |
| 2,586,804 | Fluke | Feb. 26, 1952 |